May 5, 1959 R. L. JAESCHKE 2,885,044
MAGNETIC COUPLINGS WITH ANTI-SINTERING PARTICLES
Filed Nov. 19, 1953
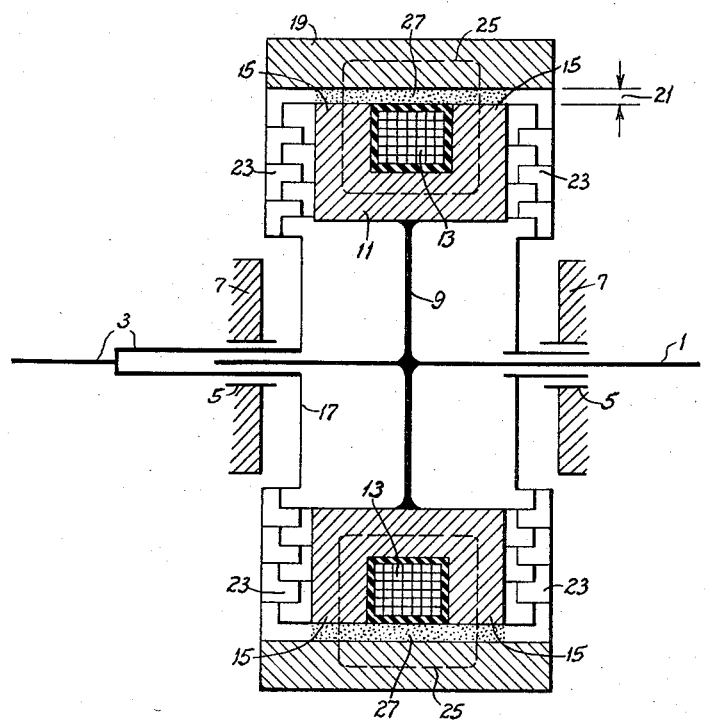
Ralph L. Jaeschke,
Inventor.
Koenig and Pope,
Attorneys.

United States Patent Office 2,885,044
Patented May 5, 1959

2,885,044

MAGNETIC COUPLINGS WITH ANTI-SINTERING PARTICLES

Ralph L. Jaeschke, Kenosha, Wis., assignor, by mesne assignments, to Eaton Manufacturing Company, Cleveland, Ohio, a corporation of Ohio Application November 19, 1953, Serial No. 393,180

13 Claims. (Cl. 192—21.5)

This invention relates to magnetic gap type couplings useful as clutches, brakes and the like, and more particularly to such a magnetic coupling incorporating in its magnetic gap a mixture in dry form of finely divided magnetizable material and an additive. The invention is an improvement upon couplings such as shown, for example, in U.S. Patents 2,519,449; 2,525,571; and 2,575,360.

Among the several objects of the invention may be noted the provision of a magnetic coupling, primarily (though not necessarily) for heavy duty, incorporating in its gap a magnetic finely divided mixture containing a superior magnetic material and an additive designed effectively to inhibit deterioration of the superior properties of said magnetic material; the provision of a clutch having a mixture of the class described wherein the additive inhibits sintering of the mixture; the provision of a clutch having a mixture of the class described wherein the additive is antisintering and chemically inert both with respect to the magnetic material of the mixture and the clutch materials forming the magnetic gap; and the provision of a clutch of the class described having a mixture wherein both the additive and magnetic components are nonhygroscopic and have a high temperature stability. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

The single figure of the accompanying drawing, which in connection with the specification illustrates various possible embodiments of the invention, is a diagrammatic axial section of a typical clutch incorporating the invention.

Briefly, the invention comprises a magnetic clutch having rotary driving and driven members spaced by an annular magnetic gap in which is carried a magnetic mixture composed of a finely divided magnetic material such as finely divided iron, stainless steel or the like, and a finely divided nonhygroscopic, highly stable, antisintering material such as aluminum oxide, chromic oxide or barium carbonate.

Referring to the drawing, there is shown a driving member 1 and a relatively rotary driven member 3, supported coaxially in suitable bearings 5 in a frame 7. The driving and driven relationship between members 1 and 3 may be interchanged. Moreover, the driven member may be nonrotary so as to function as a brake, instead of what is generally referred to as a clutch, when neither of the members 1 or 3 is stationary. It is also to be understood that the nonrotary member, without completely rotating, may rock to some degree in its bearings to apply torque to suitable scales to measure force, so that the device may function as a dynamometer.

A supporting spider 9 is carried on the driving member 1 for a ferromagnetic (iron, for example) field member 11, which carries an annular field coil 13 flanked by polar members 15. The members 15 are diagrammatically illustrated and may have uninterrupted outer annular surfaces; or, if desired, they may be formed as polar teeth, as is known. Attached to the driven member 3 is a casing 17 which supports a ferromagnetic (iron, for example) inductor drum 19 separated from the field member 11 by a magnetic gap indicated at 21. The radial dimension of this gap is minimized as much as possible, being on the order of $\frac{1}{32}$–$\frac{1}{8}$ inch in ordinary practice. Annular labyrinth seals are diagrammatically shown at 23, which seal off the gap 21 from the bearings 5. The inside and outside relationship of the members 11 and 19 may be interchanged.

By exciting the anular field coil 13 through a suitable circuit (not shown), there will be generated a toroidal flux field, as diagrammatically indicated at 25. This magnetic field surrounds the coil 13 and interlinks the ferromagnetic members 11 and 19. The magnetomotive force in the field is proportional to the ampere turns of the coil 13. When the coil is deenergized, the field substantially disappears, except for small amounts of residual magnetism that may remain.

In the space between members 11 and 19 is carried a magnetic mixture 27 which is traversed by the field 25 of coil 13. The result, as is known in the art, is to stiffen or increase the reactive shear forces in the mixture 27 in some proportion to the strength of the magnetic field. This results in the member 1 driving the member 3, with or without slip, depending upon the field strength. At partial excitations of coil 13, various degrees of rotary slip occur but with sufficient excitation the driving and driven members become synchronized in their movements.

Various dry and wet magnetic mixtures have been suggested for the material 27, including those referred to in said Patents 2,519,449 and 2,525,571. The present invention relates more particularly to improvements in apparatus of this class employing dry mixtures such as shown in said Patent 2,519,449.

Various finely divided magnetic components may be used, such as, for example, the finely divided iron set forth in Patent 2,519,449; or a less corrodible material such as finely divided stainless steel or the like. In the iron group of materials are included a finely divided iron which is on the market under the name of Carbonyl-E iron, Swedish powdered iron, and powdered electrolytic iron.

Examples of the finely divided additives to be used are aluminum oxide, chromic oxide and barium carbonate. Important characteristics of these materials for the purpose are that each is nonhygroscopic, highly inert chemically and nonreactive with iron even at high temperatures on the order of 1000° F. Moreover, each of these substances has what may be referred to as an anti-sintering effect on the finely divided ferromagnetic material.

The ferromagnetic particles that are useful in clutches of this general type have the undesirable property, when used under heavy-duty conditions without additives or with former additives, of sintering in a smooth magnetic gap. That is to say, such ferromagnetic material under heavy-duty slipping conditions tends to solidify by sintering, particularly in a smooth magnetic gap. I have discovered that a contributing cause of this effect, which is like packing, is that the particles of the finely divided ferromagnetic material sinter under the conditions of pressure and temperature occurring in couplings of this type, particularly those designed for heavy-duty performance. Herein, by sintering I mean the tendency for a mass of finely divided metal to become a coherent mass under pressure and/or heating, without reaching the liquid phase. It is this sintering action, under the operating conditions of the coupling, which favors not only the sintering together of the ferromagnetic particles, but also the formation of coherent masses attached to the ferromagnetic gap faces.

Grain size suitable for the ferromagnetic materials has a range from about 300 to 50 mesh, optimum diameters of approximately 8 microns being preferable. As to the antisintering additive materials, these should be substantially of smaller size, for example, one micron or less. Thus the size of the additive particles is a minor fraction of the size of the ferromagnetic particles. The preferable percentage of finely divided antisintering material with respect to the finely divided ferromagnetic material is approximately 2% by weight, although it may range from 1–10%. In any event the weight ratio of the antisintering material to the ferromagnetic material is a minor fraction. It will be understood that the bulk ratio of the ferromagnetic to antisintering material will not be the same as the weight ratios above specified, since all of the finely divided antisintering materials mentioned have substantially larger bulk than the finely divided ferromagnetic materials. In other words the bulk ratio of antisintering material to ferromagnetic material is greater than unity. The reason for the preferred smaller size of the particles of the antisintering additive (with respect to the size of the ferromagnetic particles) is that the former shall act as a coating material for the particles of the latter. Thus when the larger particles of ferromagnetic material tend to be pushed into engagement under heat and pressure in an operating heavy-duty coupling, this coating of the antisintering material will prevent the sintering. Thus each particle of ferromagnetic material retains its individuality in the mixture and does not become cohered with adjacent ferromagnetic particles nor with the faces of the ferro-magnetic parts 11 and 19. At the same time, the relatively small antisintering particles interfere less with the continuity of the magnetic field than if they were larger.

It may be mentioned that the antisintering coating on the ferromagnetic particles favors a smaller friction drag between them under released conditions of the coupling, so that the antisintering material may be considered under the circumstances also to act as a lubricant or antifriction material, in the sense that it permits freer movements between the ferromagnetic particles than if they were or tended to be coherent. This is regardless of the fact that such antisintering particles would not ordinarily be considered as lubricants in such devices as sleeve bearings, for example.

In view of the above it will be seen that the several objects of the invention are achieved and other advantageous results attained.

As various changes could be made in the elements above described without departing from the scope of the invention, it is intended that all matter contained in the above description or shown in the accompanying drawing shall be interpreted as illustrative and not in a limiting sense.

I claim:

1. A magnetic coupling comprising ferromagnetic driving and driven elements separated by a magnetic gap, means for generating a magnetic field interlinking said elements through the gap, and a mixture located in said gap comprising ferromagnetic particles of a size ranging between 300 and 50 mesh and substantially smaller particles of aluminum oxide having a mean diameter on the order of 1 micron or less but greater than zero.

2. A magnetic coupling comprising ferromagnetic driving and driven elements separated by a magnetic gap, means for generating a magnetic field interlinking said elements through the gap, and a mixture located in said gap comprising ferromagnetic particles of a size ranging between 300 and 50 mesh and substantially smaller particles of chromic oxide of mean diameter on the order of 1 micron or less but greater than zero.

3. A magnetic coupling comprising ferromagnetic driving and driven elements separated by a magnetic gap, means for generating a magnetic field interlinking said elements through the gap, and a mixture located in said gap comprising ferromagnetic particles of a size ranging between 300 and 50 mesh and substantially smaller particles of barium carbonate of mean diameter on the order of 1 micron or less but greater than zero.

4. A magnetic coupling comprising ferromagnetic driving and driven elements separated by a magnetic gap, means for generating a magnetic field interlinking said elements, and a mixture located in said gap comprising stainless steel magnetic particles of a size ranging from 300 to 50 mesh, and aluminum oxide particles approximating a mean diameter of 1 micron or less but greater than zero.

5. A magnetic coupling comprising ferromagnetic driving and driven elements separated by a magnetic gap, means for generating a magnetic field interlinking said elements, and a mixture located in said gap comprising iron particles of a size ranging from 300 to 50 mesh, and aluminum oxide particles approximating a mean diameter of 1 micron or less but greater than zero.

6. A ferromagnetic gap type of coupling having a magnetic gap, a finely divided dry mixture in said gap, said mixture comprising ferromagnetic particles and antisintering particles of an additive selected from the group consisting of aluminum oxide, chromic oxide and barium carbonate, the percentage by weight of the finely divided additive material to the finely divided ferromagnetic material being in the range of approximately 1–10%.

7. A ferromagnetic type of coupling having a ferromagnetic gap, a finely divided dry mixture in said gap, said mixture comprising ferromagnetic metal particles of mesh size ranging from 300 to 50 and anti-sintering particles of an additive selected from the group consisting of aluminum oxide, chromic oxide and barium carbonate, said antisintering particles being of a size which is a minor fraction of the size of the ferromagnetic particles, the percentage by weight of the finely divided additive material relative to the finely divided ferromagnetic material being in the range of approximately 1–10%.

8. A ferromagnetic type of coupling having a ferromagnetic gap, a dry powder mixture in said gap, said mixture comprising ferromagnetic metal particles of mesh size ranging from 300 to 50 and antisintering particles of an additive selected from the group consisting of aluminum oxide, chromic oxide and barium carbonate, said antisintering particles being of a size approximating one micron in diameter, the percentage by weight of the finely divided additive material to the finely divided ferromagnetic material being in the range of approximately 1–10%.

9. A magnetic type of coupling having a magnetic gap, a dry mixture in said gap, said mixture comprising finely divided magnetizable particles and a finely divided additive selected from the group consisting of aluminum oxide, chromic oxide and barium carbonate, the additive being characterized in that it forms an antisintering and separating agent between the magnetizable particles and between them and parts forming said magnetic gap, the size of the particles of the additive being a minor fraction of the size of the magnetizable particles, the weight of the antisintering material with respect to the weight of the magnetizable material being also a minor fraction, and the ratio in bulk of the antisintering material to the bulk of the magnetizable material being greater than unity.

10. A magnetic coupling comprising magnetic driving and driven elements separated by a magnetic gap, means for generating a magnetic field interlinking said elements and passing through said gap, and a mixture located in said gap comprising magnetic particles and antisintering particles of an additive selected from the group consisting of aluminum oxide, chromic oxide and barium carbonate, the size of said particles ranging from 300 to 50 mesh and said antisintering particles having a mean diameter on the order of 1 micron or less but greater than zero.

11. A magnetic coupling comprising magnetic driving and driven elements separated by a magnetic gap, means for generating a magnetic field interlinking said elements and passing through said gap, and a mixture located in said gap comprising magnetic particles and antisintering particles of an additive selected from the group consisting of aluminum oxides, chromic oxide and barium carbonate, said magnetic particles being several times larger than the antisintering particles and ranging in size from 300 to 50 mesh, said antisintering particles having a mean diameter of the order of one micron or less but greater than zero.

12. A magnetic coupling comprising magnetic driving and driven elements separated by a magnetic gap, means for generating a magnetic field interlinking said elements and passing through said gap, and a flowable mixture located in said gap comprising magnetic particles and antisintering particles of an additive selected from the group consisting of aluminum oxide, chromic oxide and barium carbonate.

13. A magnetic coupling made according to claim 12, wherein the magnetic particles are several times larger than the antisintering particles.

References Cited in the file of this patent

UNITED STATES PATENTS

| | | |
|---|---|---|
| 2,519,449 | Findlay | Aug. 22, 1950 |
| 2,663,809 | Winslow | Dec. 22, 1953 |
| 2,705,064 | Lear et al. | Mar. 29, 1955 |
| 2,778,803 | Crowley | Jan. 22, 1957 |
| 2,787,354 | Gill | Apr. 2, 1957 |

OTHER REFERENCES

Development of Magnetic Fluid Clutch (Interim Report No. 1), Shipboard Systems Branch-Electricity Division, Naval Research Laboratory, Aug. 25, 1952, 44 pp.